United States Patent
Nohr et al.

(10) Patent No.: US 7,419,357 B2
(45) Date of Patent: Sep. 2, 2008

(54) RAM AIR TURBINE BLADE DISENGAGEMENT MECHANISM FOR OVER-SPEED PREVENTION

(75) Inventors: Gary D. Nohr, Rockford, IL (US); William E. Seidel, Rockford, IL (US); David G. Bannon, Rockford, IL (US); David E. Russ, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 608 days.

(21) Appl. No.: 11/114,580

(22) Filed: Apr. 26, 2005

(65) Prior Publication Data

US 2006/0239817 A1   Oct. 26, 2006

(51) Int. Cl.
*B64C 11/00* (2006.01)
*B64C 27/00* (2006.01)

(52) U.S. Cl. .......................................... 416/44; 416/51
(58) Field of Classification Search ................... 416/44, 416/46, 50, 51, 52, 53, 156, 157 R
See application file for complete search history.

(56) References Cited

U.S. PATENT DOCUMENTS

| 2,874,787 | A | * | 2/1959 | Battenberg et al. ............ 416/48 |
| 2,997,109 | A | * | 8/1961 | Blackburn .................. 416/137 |
| 4,743,163 | A |   | 5/1988 | Markunas et al. |
| 7,296,970 | B2 | * | 11/2007 | Bannon et al. ................. 416/44 |

* cited by examiner

*Primary Examiner*—Edward Look
*Assistant Examiner*—Nathaniel Wiehe
(74) *Attorney, Agent, or Firm*—Stephen G. Mican

(57) ABSTRACT

An improved ram air turbine (RAT) prevents release of its turbine blades due an over-speed condition by detecting an over-speed condition with a trigger mechanism and rotating the blades to a fixed coarse pitch position with a release mechanism.

9 Claims, 2 Drawing Sheets

RAM AIR TURBINE BLADE DISENGAGEMENT MECHANISM FOR OVER-SPEED PREVENTION

FIELD OF THE INVENTION

The invention relates to emergency supplemental power supplies for aeronautical applications, and more particularly to an improved ram air turbine for generating emergency supplemental power for aircraft in flight.

BACKGROUND OF THE INVENTION

A ram air turbine (RAT) is a device for generating emergency supplemental power in a wide variety of aircraft. A RAT may generate hydraulic power, electric power or both. A RAT incorporates a turbine that extracts power from an air stream proximate the aircraft in flight. A typical RAT in current use is described in U.S. Pat. No. 4,743,163 to Markunas et al., owned by the assignee of this application, and incorporated herein by reference. The turbine is coupled to suitable power generating equipment, such as a hydraulic pump for hydraulic power and an electric generator for electric power.

As described in Markunas et al., the turbine includes a speed governor that changes the turbine blade position to maintain a relatively constant shaft speed to the power generating equipment. Failure of the turbine speed governor can cause an over-speed condition that may ultimately cause the release of a turbine blade at very high speed. Due to the high speed, the wayward blade has very high energy as well. The most common cause of governor failure is due to seizure of the bearing between the turbine shaft and the governor yoke plate that controls the pitch of the turbine blades.

The potential release of a high energy blade proximate the aircraft is a concern for both commercial and military RAT applications. Should the wayward blade strike the aircraft fuselage, it may penetrate the skin and cause damage to electric or hydraulic power equipment or control systems. It may also injure passengers or crew. If one of the propulsion engines ingests the wayward blade, the engine may suffer severe damage that results in loss of thrust.

Current methods to minimise hazards caused by turbine over-speed-induced release of a turbine blade have involved strategic placement of key elements or shields to prevent penetration. These methods no longer satisfy increasingly stringent certification and safety requirements promoted by airworthiness authorities.

SUMMARY OF THE INVENTION

The invention comprises an RAT that prevents release of its turbine blades due an over-speed condition by detecting an over-speed condition with a trigger mechanism and rotating the blades to a fixed coarse pitch position with a release mechanism.

In a preferred embodiment, the invention comprises an RAT for generating emergency aeronautical supplemental power that has a governor for automatically adjusting the pitch of turbine blades rotatingly attached to a RAT turbine hub with an axis of rotation and coupled to a counterweight assembly, comprising: a trigger mechanism in a root of each turbine blade responsive to an over-speed condition of the turbine hub; and a release mechanism for each turbine blade responsive to the trigger mechanism that frees the turbine blades from the counterweight assembly and lets them assume a fixed coarse pitch condition.

DETAILED DESCRIPTION OF THE INVENTION

As described in Markunas et al., during normal operation RAT speed is controlled with a counterweight/spring governor balance system. As speed increases the centrifugal torque of a blade/counterweight assembly increases. This torque acts through a cam follower and yoke plate slidingly supported by a turbine shaft to compress a helical spring and thus change the position of the yoke plate. The yoke plate engages pins coupled to the blades that move the blades to a coarser angle with movement of the yoke plate and thus extract less power from the air stream. In this way, the turbine speed is controlled over a range of airspeeds, altitudes and loads.

Such a mechanical governor system requires a translation of rotary motion about the axis of the turbine shaft due to the blade/counterweight assembly turning about the blade pitch change axis to axial motion along the turbine shaft such that the force balance with the helical spring can be affected. The translation occurs by means of a roller bearing on the counterweight assembly that engages a bearing surface on the yoke plate. The yoke plate in turn engages the turbine shaft with a linear bearing to slide along the turbine shaft, so that low-friction translation is obtained. Unfortunately, seizure of this linear bearing sometimes occurs and such seizure tends to lock the blades at or near the fine pitch position. In this position, the turbine is most susceptible to over-speed. The invention dramatically reduces the likelihood of over-speed-induced release of a turbine blade due to such a failure of the mechanical governor system.

Figure 1:
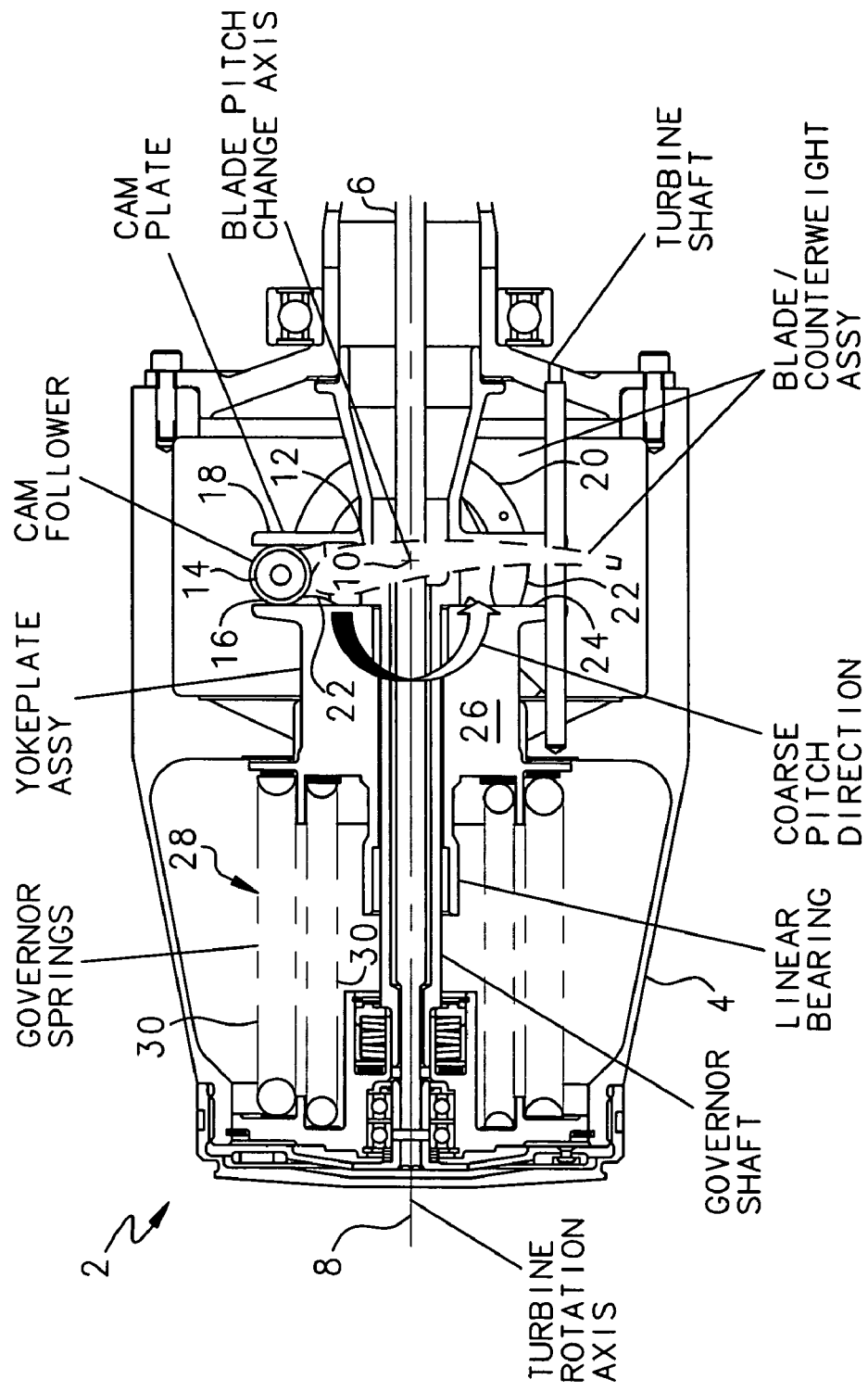
FIG. 1 is a cut-away side view of a portion of a ram air turbine according to a preferred embodiment of the invention.

FIG. 1 is a cut-away side view of a portion of a RAT 2 according to a preferred embodiment of the invention. A turbine hub 4 for the RAT 2 has a turbine shaft 6 with a turbine shaft axis of rotation 8 generally perpendicular to a turbine blade pitch axis of rotation 10. Relative to the governor axis 8, rotary motion of turbine blades 12 rotatingly attached to the turbine hub 4 translates to axial motion through cam follower or op pins 14 and cam slots 16 in a cam plate 18 to a counterweight assembly 20 by means of a counterweight contact roller bearing or op pin roller 22.

At start-up, the turbine blades 12 maintain a fine pitch position. An air stream generally parallel to the turbine shaft axis 8 due to motion of the RAT 2 causes the turbine blades 12 to revolve about the turbine shaft axis 8. Resulting centrifugal twisting moments (CTMs) on the turbine blades 12 due to the air stream and counterweight assembly 20 cause them to start to rotate toward a coarse pitch position. The op pin roller 22 engages a bearing surface 24 of a governor yoke plate 26 to cause a corresponding axial motion of the yoke plate 26. As the yoke plate 26 moves axially in response to the change of position of the op pin roller 16, the yoke plate 26 compresses a governor spring assembly 28.

The yoke plate 26 changes the pitch of the turbine blades 12 as it moves axially and this brings about a force equilibrium that ultimately controls turbine speed. Although the governor spring assembly 28 comprises two nested helical springs 30 in FIG. 1, any number of helical springs, or alternatively, other axial spring designs such as disc (Belleville) springs, may be used.

Figure 2:
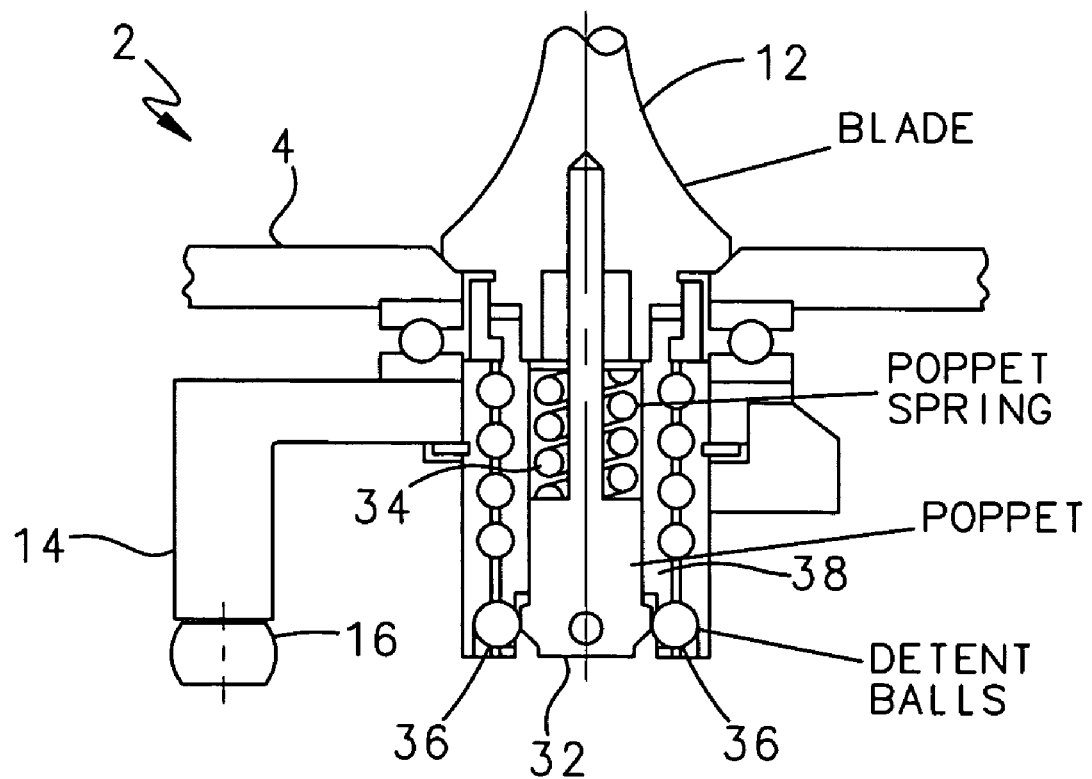
FIG. 2 is a detailed partial side view of one of the turbine blades for the ram air turbine shown in FIG. 1.

FIG. 2 shows a detailed partial side view of one of the turbine blades 12 rotatingly attached to the turbine hub 4 that illustrate the invention. In essence, the invention comprises a trigger mechanism responsive to an over-speed condition due to governor failure and a turbine blade release mechanism responsive to the trigger mechanism that lets the turbine blades 12 assume a coarse pitch position to slow down the RAT to a safe speed.

In particular, each turbine blade 12 has a blade root that comprises an attached poppet or slidable guide 32 biased radially inward toward the governor axis 8 by a bias spring 34. In normal operation, each poppet 32 couples to a cam follower pin 14 through detent balls 36 such that each turbine blade 12 and corresponding cam follower pin 14 are fixed together due to a preload force of its corresponding bias spring 34.

In this embodiment, the detent balls 36 serve as the over-speed trigger mechanism. In the event of a turbine speed that exceeds normal operation, such as caused by seizure of the yoke plate 26 to the bearing surface 24, centrifugal force of each turbine blade 12 shall cause its poppet 32 to overcome the preload force of its corresponding bias spring 34, thereby forcing the poppet 32 radially outward. This radial movement allows the corresponding detent balls 36 to move radially inward toward the governor axis 8 out of their detent position.

When the detent balls 36 move out of their detent position, each turbine blade 12 is free to rotate by means of a release mechanism responsive to the trigger mechanism. In this embodiment, the release mechanism comprises a ball screw mechanism 38 that fits coaxially over each poppet 32. When so released, the turbine blades 12 tend to rotate toward their fully coarse position due to centrifugal twisting moments (CTMs) caused by the air stream.

This rotation allows the turbine blades 12 to move to their fully coarse position, thereby causing the RAT 2 to decelerate to a point below the maximum normal operating speed. Once the poppets 32 are tripped, the RAT 2 operates as a fixed pitch turbine with the blades 12 in their coarsest position. Although the configuration described above uses detent balls 36 as a trigger mechanism, any convenient speed-sensitive triggering mechanism can be similarly employed, such as a clutch or breakable link. Likewise, although the configuration described above uses a ball screw mechanism 38 as a release mechanism to allow the blades 12 to rotate free of their respective op pins 14, other mechanisms such as acme threads or helical splines may be similarly applied.

Described above is an improved ram air turbine (RAT) that prevents release of its turbine blades due an over-speed condition by detecting an over-speed condition with a trigger mechanism and rotating the blades to a fixed coarse pitch position with a release mechanism. It should be understood that this embodiment is only an illustrative implementation of the invention, that the various parts and arrangement thereof may be changed or substituted, and that the invention is only limited by the scope of the attached claims.

What is claimed is:

1. A ram air turbine (RAT) for generating emergency aeronautical supplemental power that has a governor for automatically adjusting the pitch of turbine blades rotatingly attached to a RAT turbine hub with an axis of rotation and coupled to a counterweight assembly, comprising:

a trigger mechanism in a root of each turbine blade responsive to an over-speed condition of the turbine hub that comprises a poppet radially biased toward the turbine axis by a bias spring and held in place by detent balls; and a release mechanism for each turbine blade responsive to the trigger mechanism that frees the turbine blades from the counterweight assembly and lets them assume a fixed coarse pitch condition.

2. The RAT of claim 1, wherein the detent balls couple each turbine blade to the counterweight assembly.

3. The RAT of claim 1, wherein centrifugal force of the turbine blades overcomes the force of the bias spring in an over-speed condition to displace the poppet radially outward from the turbine axis away from the detent balls.

4. The RAT of claim 1, wherein each release mechanism comprises a ball screw mechanism arranged around the root of its turbine blade.

5. A ram air turbine (RAT) for generating emergency aeronautical supplemental power that has a governor for automatically adjusting the pitch of turbine blades rotatingly attached to a RAT turbine hub with an axis of rotation and coupled to a counterweight assembly, comprising:

a trigger mechanism in a root of each turbine blade responsive to an over-speed condition of the turbine hub that comprises a poppet radially biased toward the turbine axis by a bias spring and held in place by detent balls; and a release mechanism for each turbine blade responsive to the trigger mechanism that frees the turbine blades from the counterweight assembly and lets them assume a fixed coarse pitch condition that comprises a ball screw mechanism arranged around the root of its turbine blade.

6. The RAT of claim 5, wherein the detent balls couple each turbine blade to the counterweight assembly.

7. The RAT of claim 6, wherein centrifugal force of the turbine blades overcomes the force of the bias spring in an over-speed condition to displace the poppet radially outward from the turbine axis away from the detent balls.

8. A ram air turbine (RAT) for generating emergency aeronautical supplemental power that has a governor for automatically adjusting the pitch of turbine blades rotatingly attached to a RAT turbine hub with an axis of rotation and coupled to a counterweight assembly, comprising:

a trigger mechanism in a root of each turbine blade responsive to an over-speed condition of the turbine hub that comprises a poppet radially biased toward the turbine axis by a bias spring and held in place by detent balls that couple each turbine blade to the counterweight assembly; and a release mechanism for each turbine blade responsive to the trigger mechanism that frees the turbine blades from the counterweight assembly and lets them assume a fixed coarse pitch condition that comprises a ball screw mechanism arranged around the root of its turbine blade.

9. The RAT of claim 8, wherein centrifugal force of the turbine blades overcomes the force of the bias spring in an over-speed condition to displace the poppet radially outward from the turbine axis away from the detent balls.

* * * * *